(12) United States Patent
Blondin et al.

(10) Patent No.: US 12,710,851 B2
(45) **Date of Patent: *Aug. 18, 2026**

(54) TOUCH ELECTRODES WITH BAR AND STRIPE PATTERN

(71) Applicant: Apple Inc., Cupertino, CA (US)

(72) Inventors: Christophe Blondin, Palo Alto, CA (US); Xiaoqi Zhou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,863

(22) Filed: Jul. 19, 2024

(65) Prior Publication Data

US 2024/0377915 A1 Nov. 14, 2024

Related U.S. Application Data

(63) Continuation of application No. 18/154,693, filed on Jan. 13, 2023, now Pat. No. 12,045,427, which is a (Continued)

(51) Int. Cl.

*G06F 3/044* (2006.01)
*G06F 3/041* (2006.01)

(52) U.S. Cl.

CPC .......... *G06F 3/0446* (2019.05); *G06F 3/0443* (2019.05); *G06F 3/0445* (2019.05);

(Continued)

(58) Field of Classification Search

CPC .... G06F 3/0446; G06F 3/0443; G06F 3/0445; G06F 3/04166; G06F 2203/04104;

(Continued)

(56) References Cited

U.S. PATENT DOCUMENTS 8,947,370 B2 * 2/2015 An ........................ G06F 3/0446 345/173
9,280,233 B1 3/2016 Tong (Continued)

FOREIGN PATENT DOCUMENTS

CN 101566895 A 10/2009
CN 102929576 A 2/2013

(Continued)

OTHER PUBLICATIONS

Advisory Action received for U.S. Appl. No. 17/067,579, mailed on Mar. 4, 2022, 2 pages.

(Continued)

*Primary Examiner* — Md Saiful A Siddiqui
(74) *Attorney, Agent, or Firm* — Kubota & Basol LLP

(57) ABSTRACT

This relates to touch sensor panels/touch screens including touch electrodes in a bar-and-stripe pattern. The bar-and-stripe pattern can improve touch signal levels for touch detection and improve uniformity of touch signal as objects move across the touch sensor panel/touch screen. Touch electrodes in a bar-and-stripe pattern can be formed from metal mesh in one or more layers of metal mesh. In some examples, "stripes" can be formed from groups of touch electrode segments in a first layer of metal mesh and can be interconnected by bridges formed in a second layer of metal mesh, different from the first layer of metal mesh, in the active area of the touch screen. Multiple stripes can be interconnected in the border area and/or in the active area to form a row touch electrode. In some examples, "bars" may also include bridges in the second layer of metal mesh.

20 Claims, 12 Drawing Sheets

Related U.S. Application Data continuation of application No. 16/998,812, filed on Aug. 20, 2020, now Pat. No. 11,556,216.

(60) Provisional application No. 62/969,652, filed on Feb. 3, 2020.

(52) U.S. Cl.
CPC .................... *G06F 3/04166* (2019.05); *G06F 2203/04104* (2013.01); *G06F 2203/04111* (2013.01); *G06F 2203/04112* (2013.01)

(58) Field of Classification Search
CPC .. G06F 2203/04111; G06F 2203/04112; G06F 3/0412; G06F 3/0448; G06F 3/0416
See application file for complete search history.

(56) References Cited

U.S. PATENT DOCUMENTS

| | | | | |
|---|---|---|---|---|
| 9,627,463 | B2 | 4/2017 | Kwon et al. | |
| 9,706,607 | B2 | 7/2017 | Kim et al. | |
| 9,798,430 | B2 | 10/2017 | Hayashi et al. | |
| 9,811,221 | B2 | 11/2017 | Hayashi et al. | |
| 9,921,696 | B2 | 3/2018 | Hotelling et al. | |
| 9,927,832 | B2 | 3/2018 | Tanemura et al. | |
| 10,324,575 | B2 | 6/2019 | Hwang et al. | |
| 10,915,190 | B2 | 2/2021 | Gong | |
| 11,556,216 | B2 | 1/2023 | Blondin et al. | |
| 2012/0081324 | A1* | 4/2012 | Philipp | G02F 1/13338 345/173 |
| 2012/0229417 | A1* | 9/2012 | Badaye | G06F 3/04166 345/174 |
| 2013/0038574 | A1* | 2/2013 | Chang | G06F 3/0418 345/174 |
| 2013/0191804 | A1 | 7/2013 | Bytheway et al. | |
| 2014/0035833 | A1 | 2/2014 | Gorsica et al. | |
| 2014/0111709 | A1* | 4/2014 | Kim | G02F 1/13338 349/12 |
| 2014/0118299 | A1 | 5/2014 | Wang et al. | |
| 2014/0160373 | A1 | 6/2014 | Hsu et al. | |
| 2014/0347319 | A1 | 11/2014 | Lin et al. | |
| 2015/0001060 | A1* | 1/2015 | Kim | G06F 3/0445 200/600 |
| 2015/0002752 | A1 | 1/2015 | Shepelev et al. | |
| 2015/0049260 | A1* | 2/2015 | Yashiro | G06F 3/0446 349/12 |
| 2015/0054803 | A1* | 2/2015 | Yashiro | G09G 3/3648 345/206 |
| 2015/0084922 | A1 | 3/2015 | Park et al. | |
| 2015/0242013 | A1* | 8/2015 | Ono | G06F 3/0446 345/174 |
| 2016/0048248 | A1 | 2/2016 | Na et al. | |
| 2016/0139725 | A1 | 5/2016 | Noguchi et al. | |
| 2016/0170518 | A1* | 6/2016 | Donnelly | G06F 3/0445 345/174 |
| 2017/0193265 | A1 | 7/2017 | Chan et al. | |
| 2017/0262097 | A1 | 9/2017 | Rowe et al. | |
| 2017/0269744 | A1 | 9/2017 | Gharghi et al. | |
| 2018/0024673 | A1 | 1/2018 | Han et al. | |
| 2018/0067584 | A1 | 3/2018 | Zhu et al. | |
| 2018/0069191 | A1 | 3/2018 | Lee et al. | |
| 2018/0129351 | A1 | 5/2018 | Qiao et al. | |
| 2018/0157354 | A1 | 6/2018 | Blondin et al. | |
| 2018/0203531 | A1 | 7/2018 | Tsai et al. | |
| 2018/0224967 | A1* | 8/2018 | Church | G06F 3/0448 |
| 2019/0056819 | A1 | 2/2019 | Moon et al. | |
| 2019/0204974 | A1 | 7/2019 | Gong | |
| 2019/0294278 | A1 | 9/2019 | Kim et al. | |
| 2020/0167038 | A1* | 5/2020 | Lee | G06F 3/0443 |
| 2021/0141491 | A1 | 5/2021 | Gogte et al. | |
| 2021/0240303 | A1 | 8/2021 | Blondin et al. | |
| 2021/0365153 | A1 | 11/2021 | Feng | |
| 2022/0382416 | A1 | 12/2022 | Gogte et al. | |
| 2023/0168783 | A1 | 6/2023 | Blondin et al. | |
| 2024/0231552 | A1 | 7/2024 | Gogte et al. | |

FOREIGN PATENT DOCUMENTS

| | | | |
|---|---|---|---|
| CN | 104331189 | A | 2/2015 |
| CN | 205080527 | U | 3/2016 |
| CN | 105706020 | A | 6/2016 |
| CN | 106325590 | A | 1/2017 |
| CN | 106775066 | A | 5/2017 |
| CN | 108735781 | A | 11/2018 |
| CN | 110347278 | A | 10/2019 |
| CN | 118011701 | A | 5/2024 |
| DE | 102018205445 | A1 | 10/2019 |
| JP | 2015-106240 | A | 6/2015 |
| KR | 10-2011-0104349 | A | 9/2011 |
| KR | 10-2012-0020929 | A | 3/2012 |
| KR | 10-2013-0035763 | A | 4/2013 |
| KR | 10-2013-0069938 | | 6/2013 |
| KR | 10-2014-0018120 | | 2/2014 |
| KR | 10-2015-0033299 | A | 4/2015 |
| KR | 10-2015-0106085 | | 9/2015 |
| KR | 10-2018-0025036 | | 3/2018 |
| KR | 10-2018-0036431 | | 4/2018 |
| KR | 10-2018-0047586 | | 5/2018 |
| KR | 10-2018-0047604 | | 5/2018 |
| KR | 10-2018-0079025 | | 7/2018 |
| KR | 10-2019-0047536 | | 5/2019 |
| KR | 10-2019-0111176 | | 10/2019 |
| KR | 10-2020-0009800 | | 1/2020 |

OTHER PUBLICATIONS

Corrected Notice of Allowability received for U.S. Appl. No. 18/154,693, mailed on Jun. 5, 2024, 2 pages.
Final Office Action received for U.S. Appl. No. 16/998,812, mailed on Dec. 29, 2021, 27 pages.
Final Office Action received for U.S. Appl. No. 17/067,579, mailed on Nov. 17, 2021, 13 pages.
Non-Final Office Action received for U.S. Appl. No. 16/998,812, mailed on Jul. 8, 2021, 21 pages.
Non-Final Office Action received for U.S. Appl. No. 16/998,812, mailed on Mar. 31, 2022, 29 pages.
Non-Final Office Action received for U.S. Appl. No. 17/067,579, mailed on Jun. 10, 2021, 15 pages.
Non-Final Office Action received for U.S. Appl. No. 17/818,695, mailed on Jul. 7, 2023, 14 pages.
Non-Final Office Action received for U.S. Appl. No. 18/154,693, mailed on Oct. 12, 2023, 36 pages.
Notice of Allowability received for U.S. Appl. No. 17/818,695, mailed on Feb. 21, 2024, 2 pages.
Notice of Allowability received for U.S. Appl. No. 18/154,693, mailed on Mar. 19, 2024, 12 pages.
Notice of Allowance received for U.S. Appl. No. 16/998,812, mailed on Sep. 9, 2022, 12 pages.
Notice of Allowance received for U.S. Appl. No. 17/067,579, mailed on May 4, 2022, 9 Pages.
Notice of Allowance received for U.S. Appl. No. 17/818,695, mailed on Oct. 31, 2023, 8 pages.
Search Report received for Chinese Patent Application No. 202011228173.0, mailed on Jan. 3, 2024, 6 pages (3 pages of English Translation and 3 pages of Official Copy).
Search Report received for Chinese Patent Application No. 202110143632.3, mailed on Mar. 7, 2024, 5 pages (3 pages of English Translation & 2 pages of Official Copy).
Non-Final Office Action received for U.S. Appl. No. 18/615,701, mailed on Nov. 20, 2024, 15 pages.
Search Report received for Chinese Patent Application No. 202011228173.0, mailed on Jun. 5, 2024, 3 pages (1 page of English Translation and 2 pages of Official Copy).
Search Report received for Chinese Patent Application No. 202110143632.3, mailed on Jul. 18, 2024, 4 pages (1 page of English Translation and 3 pages of Official Copy).

(56) References Cited

OTHER PUBLICATIONS

Corrected Notice of Allowability received for U.S. Appl. No. 18/615,701, mailed on Jun. 3, 2025, 2 pages.
Notice of Allowance received for U.S. Appl. No. 18/615,701, mailed on May 14, 2025, 8 pages.

* cited by examiner

TOUCH ELECTRODES WITH BAR AND STRIPE PATTERN

CROSS REFERENCE TO RELATED APPLICATIONS

This application is a continuation of U.S. patent application Ser. No. 18/154,693, filed Jan. 13, 2023, and published on Jun. 1, 2023 as U.S. Publication No. 2023-0168783, which is a continuation of U.S. patent application Ser. No. 16/998,812, filed Aug. 20, 2020, and issued on Jan. 17, 2023 as U.S. Pat. No. 11,556,216, which claims the benefit under 35 USC 119(e) of U.S. Provisional Application No. 62/969,652, filed Feb. 3, 2020, the contents of which are incorporated herein by reference in their entireties for all purposes.

FIELD OF THE DISCLOSURE

This relates generally to touch sensor panels, and more particularly to touch sensor panels including touch electrodes with a bar-and-stripe pattern.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

BRIEF SUMMARY OF THE DISCLOSURE

This relates to touch sensor panels/touch screens including touch electrodes in a bar-and-stripe pattern. The bar-and-stripe pattern can improve touch signal levels for touch detection and improve uniformity of touch signal as objects move across the touch sensor panel/touch screen. Touch electrodes in a bar-and-stripe pattern can be formed from metal mesh in a single layer of metal mesh. In some examples, "stripes" can be formed from groups of touch electrode segments interconnected by bridges (formed in a second layer of metal mesh different from the first layer of metal mesh) in the active area of the touch screen (visible area of the display) and multiple stripes can be interconnected in the border area (outside of the visible area of the display) and/or in the active area to form a row touch electrode. In some examples, "bars" may also include bridges. To reduce the visibility of the metal mesh touch electrodes, the boundary between touch electrodes can be non-linear (with electrical discontinuities in the metal mesh in a non-linear pattern proceeding along the boundary) in some examples. In some examples, dummy cuts (electrical discontinuities in the metal mesh) can be made within an area of a touch electrode region (e.g., while maintaining the same electrical potential for the touch electrode region).

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch sensor panels/touch screens including touch electrodes in a bar-and-stripe pattern. The barand-stripe pattern can improve touch signal levels for touch detection and improve uniformity of touch signal as objects move across the touch sensor panel/touch screen. Touch electrodes in a bar-and-stripe pattern can be formed from metal mesh in a single layer of metal mesh. In some examples, "stripes" can be formed from groups of touch electrode segments interconnected by bridges (formed in a second layer of metal mesh different from the first layer of metal mesh) in the active area of the touch screen (visible area of the display) and multiple stripes can be interconnected in the border area (outside of the visible area of the display) and/or in the active area to form a row touch electrode. In some examples, "bars" may also include bridges. To reduce the visibility of the metal mesh touch electrodes, the boundary between touch electrodes can be non-linear (with electrical discontinuities in the metal mesh in a non-linear pattern proceeding along the boundary) in some examples. In some examples, dummy cuts (electrical discontinuities in the metal mesh) can be made within an area of a touch electrode region (e.g., while maintaining the same electrical potential for the touch electrode region).

Figures 1A, 1B, 1C, 1D, 1E:
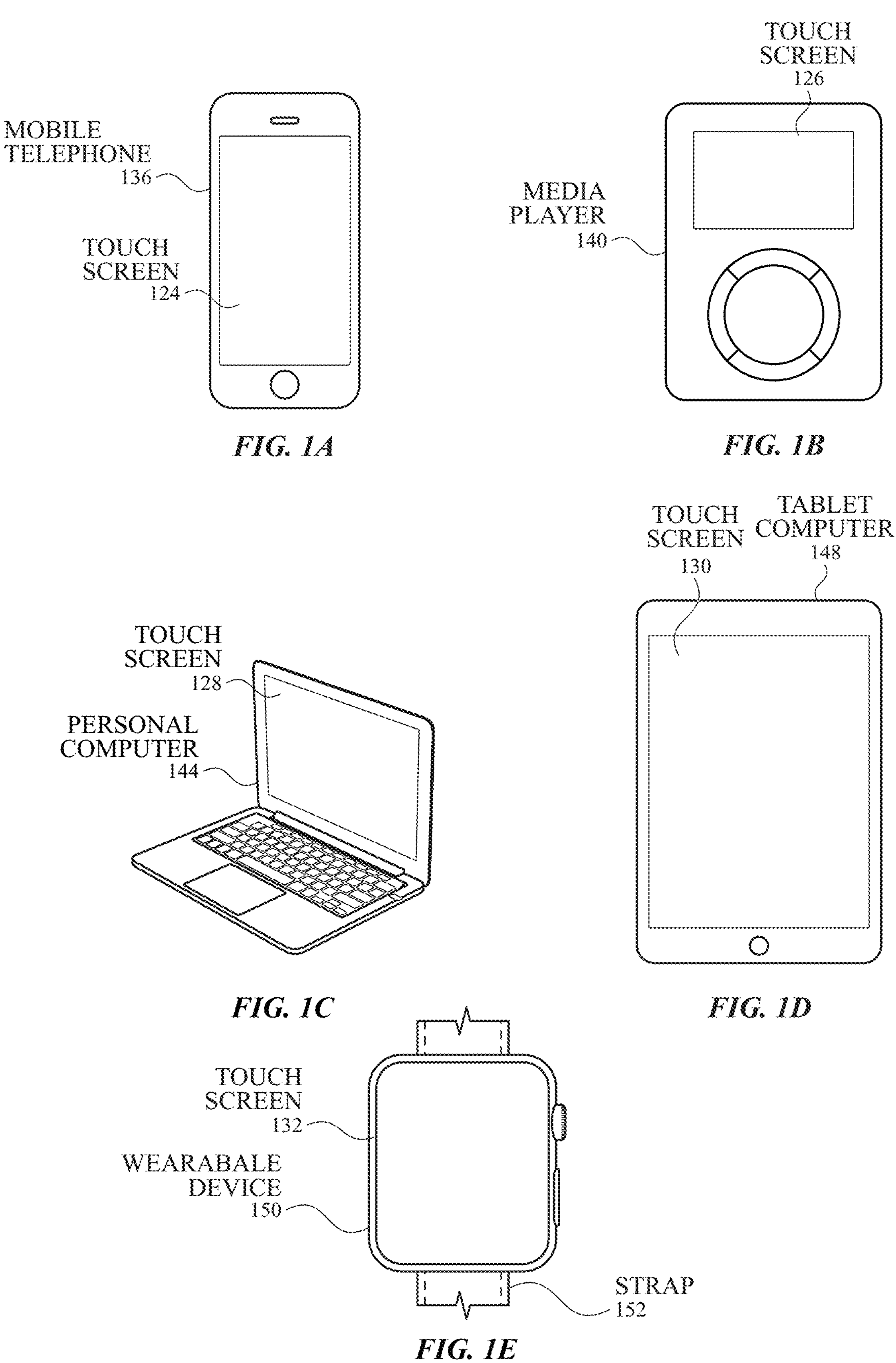
FIGS. 1A-1E illustrate example systems that can include a touch screen according to examples of the disclosure.

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
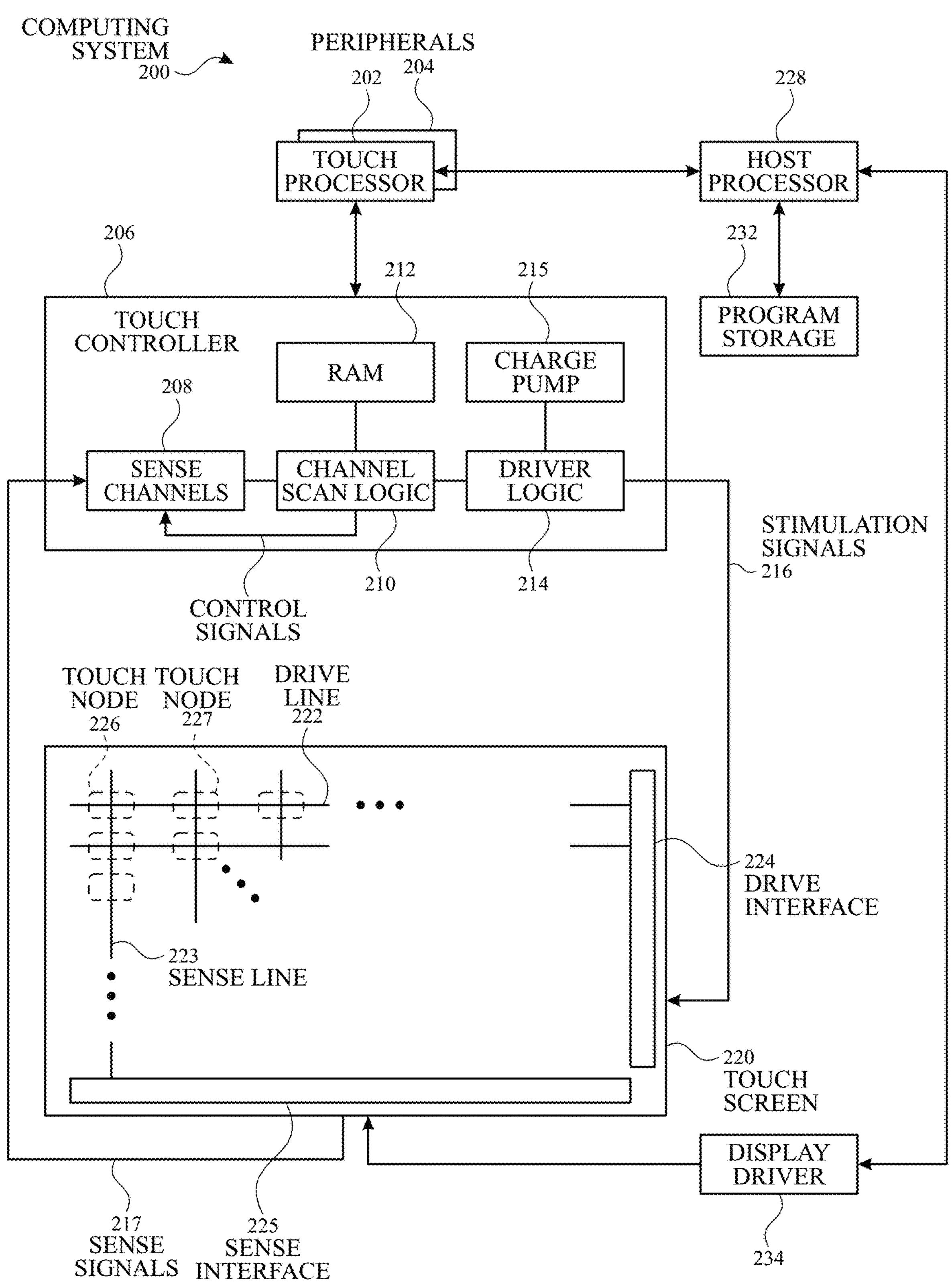
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
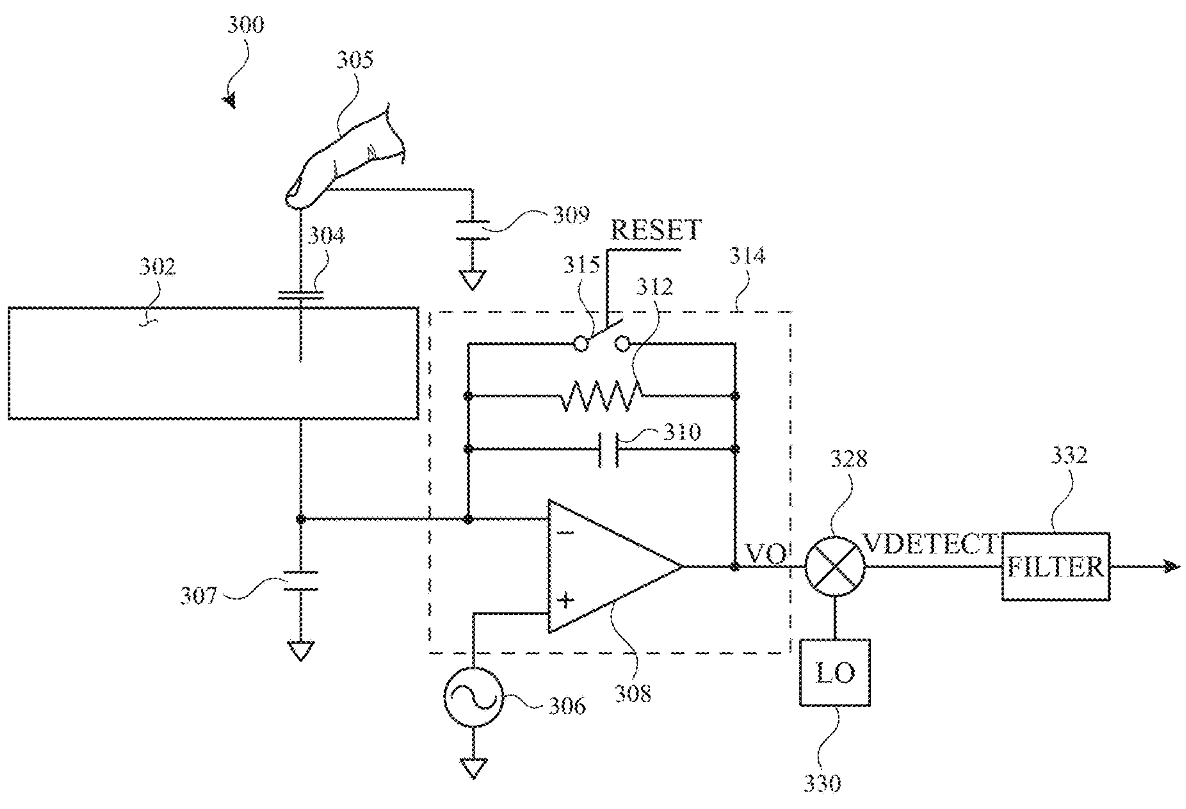
FIG. 3A illustrates an example touch sensor circuit corresponding to a self-capacitance measurement of a touch node electrode and sensing circuit according to examples of the disclosure.

FIG. 3A illustrates an example touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
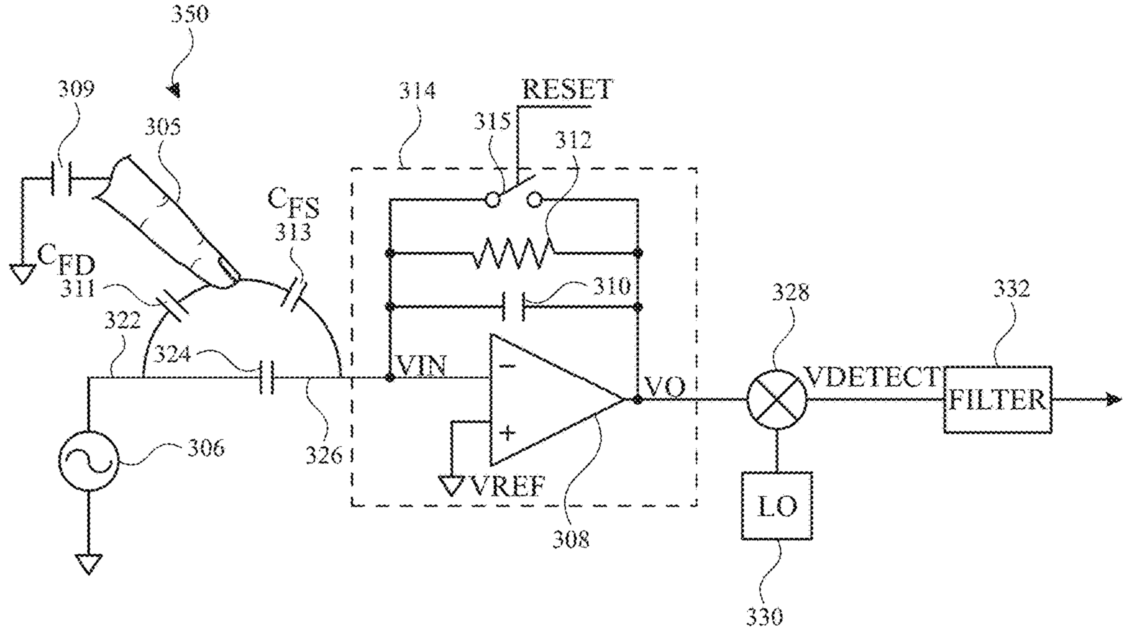
FIG. 3B illustrates an example touch sensor circuit corresponding to a mutual-capacitance drive line and sense line and sensing circuit according to examples of the disclosure.

FIG. 3B illustrates an example touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{re}$f. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
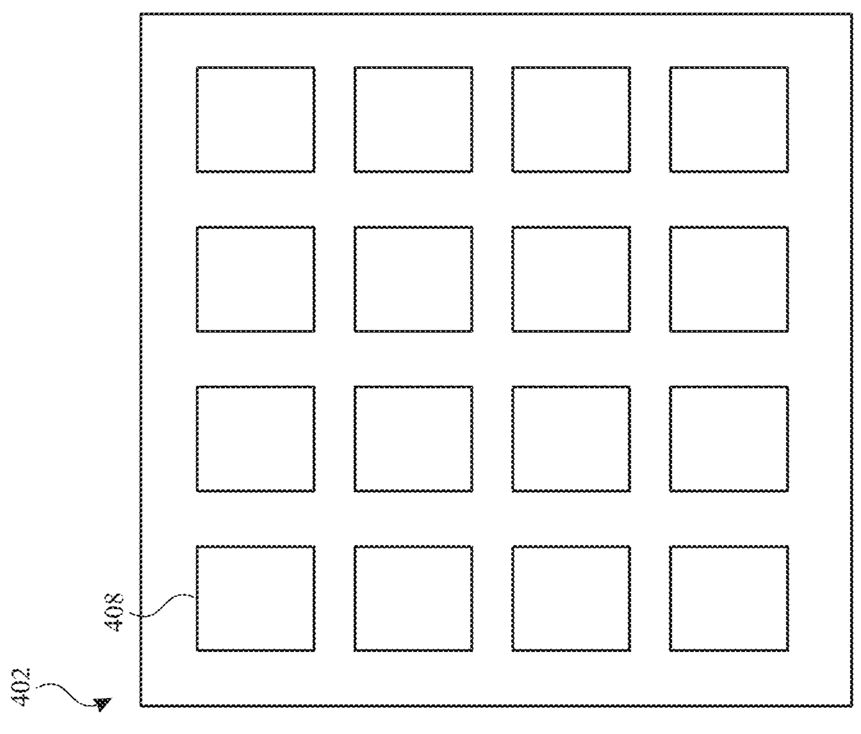
FIG. 4B illustrates touch screen with touch node electrodes arranged in a pixelated touch node electrode configuration according to examples of the disclosure.
Figure 4A:
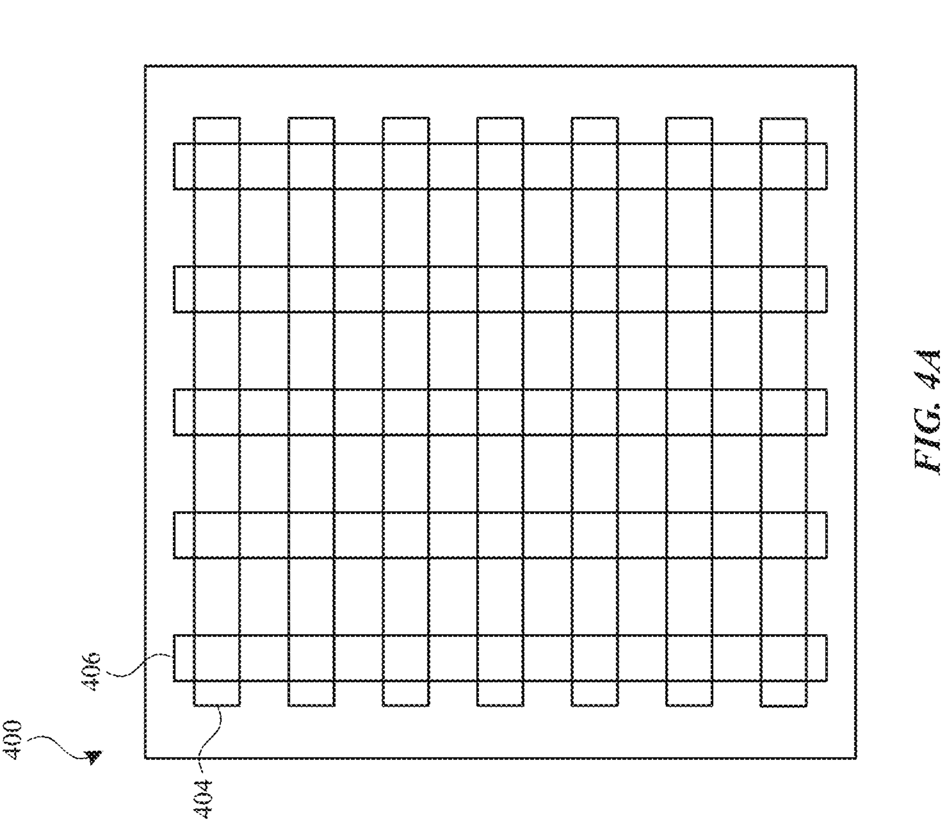
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, the touch electrodes can be formed on the same layer, and may be referred to herein as a single-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 402 can sense the self-capacitance of touch node electrodes

408 to detect touch and/or proximity activity on touch screen 402, and in some examples, touch screen 402 can sense the mutual capacitance between touch node electrodes 408 to detect touch and/or proximity activity on touch screen 402.

Figure 5A:
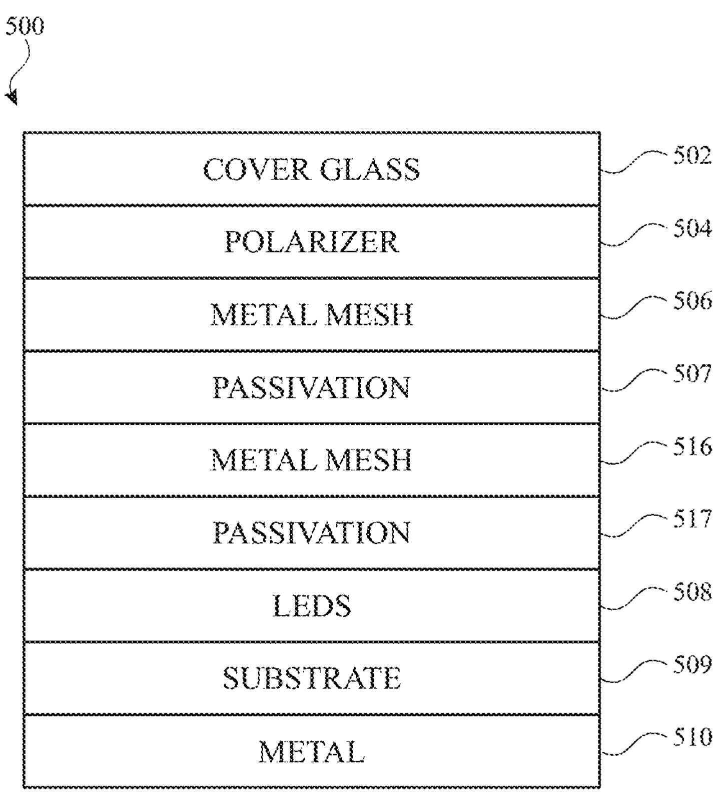
FIG. 5A illustrates an example touch screen stack-up including a metal mesh layer according to examples of the disclosure.

As described herein, in some examples, touch electrodes of the touch screen can be formed from a metal mesh. FIG. 5A illustrates an example touch screen stack-up including a metal mesh layer according to examples of the disclosure. Touch screen 500 can include a substrate 509 (e.g., a printed circuit board) upon which display LEDs 508 can be mounted. In some examples, the LEDs 508 can be partially or fully embedded in substrate 509 (e.g., the components can be placed in depressions in the substrate). Substrate 509 can include routing traces in one or more layers (e.g., represented by metal layer 510 in FIG. 5A) to route the LEDs to display driving circuitry (e.g., display driver 234). The stack-up of touch screen 500 can also include one or more passivation layers deposited over the LEDs 508. For example, the stack-up of touch screen 500 illustrated in FIG. 5 can include a passivation layer 507 (e.g., transparent epoxy) and passivation layer 517. Passivation layers 507 and 517 can planarize the surface for respective metal mesh layers. Additionally, the passivation layers can provide electrical isolation (e.g., between metal mesh layers and between the LEDs and a metal mesh layer. Metal mesh layer 516 (e.g., copper, silver, etc.) can be deposited on the planarized surface of the passivation layer 517 over the display LEDs 508, and metal mesh layer 506 (e.g., copper, silver, etc.) can be deposited on the planarized surface of passivation layer 507. In some examples, the passivation layer 517 can include material to encapsulate the LEDs to protect them from corrosion or other environmental exposure. Metal mesh layer 506 and/or metal mesh layer 516 can include a pattern of conductor material in a mesh pattern described below. In some examples, metal mesh layer 506 and metal mesh layer 516 can be coupled by one or more vias. Additionally, although not shown in FIG. 5A, a border region around the display active area can include metallization (or other conductive material) that may or may not be a metal mesh pattern. In some examples, metal mesh is formed of a non-transparent material but the metal mesh wires are sufficiently thin and sparse to appear transparent to the human eye. The touch electrodes (and some routing) as described herein can be formed in the metal mesh layer(s) from portions of the metal mesh. In some examples, polarizer 504 can be disposed above the metal mesh layer 506 (optionally with another planarization layer disposed over the metal mesh layer 506). Cover glass (or front crystal) 502 can be disposed over polarizer 504 and form the outer surface of touch screen 500. It is understood that although two metal mesh layers (and two corresponding planarization layers) are illustrated, in some examples more or fewer metal mesh layers (and corresponding planarization layers) can be implemented. Additionally, it is understood that LEDs 508, substrate 509, metal layer 510, and/or passivation layer 517 can be replaced by a thin-film transistor (TFT) LCD display (or other types of displays), in some examples. Additionally, it is understood that polarizer 504 can include one or more transparent layers including a polarizer, adhesive layers (e.g., optically clear adhesive) and protective layers.

Figure 5B:
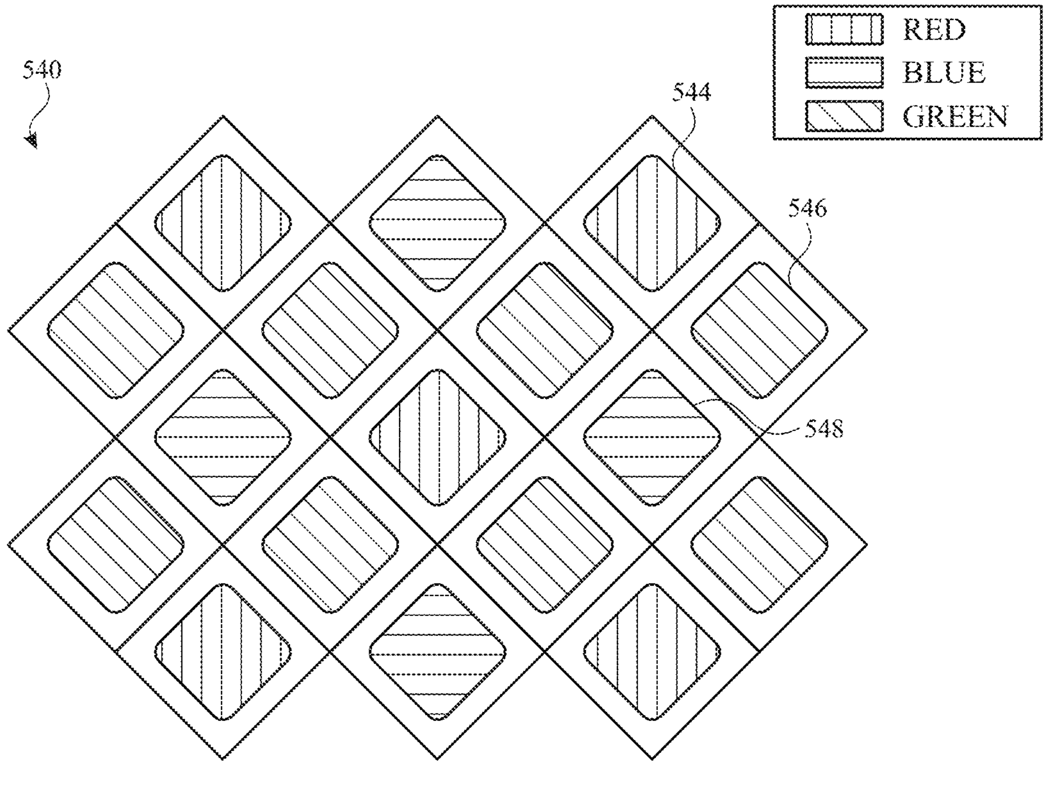
FIG. 5B illustrate top views of a portion of a touch screen according to examples of the disclosure.

FIG. 5B illustrates a top view of a portion of touch screen 500 in a diamond pattern according to examples of the disclosure. The top view shows metal mesh 540 (e.g., a portion of metal mesh layer 506) together with LEDs 508 of touch screen 500. The LEDs can be arranged in groups of three proximate LEDs, including a red LED (e.g., red LED 544), a green LED (e.g., green LED 546), and a blue LED (e.g., blue LED 548), to form standard red-green-blue (RGB) display pixels. Although primarily described herein in terms of an RGB display pixel, it is understood that other touch pixels are possible with different numbers of LEDs and/or different color LEDs. The metal mesh can be formed of conductors (e.g., metal mesh wires formed from conductive materials such as copper, silver, etc.) disposed in a pattern to allow light to pass (at least vertically) through the gaps in the mesh (e.g., the LEDs 508 can be disposed in the LED layer opposite openings in the metal mesh disposed in the metal mesh layer(s) 506 and/or 516). In other words, the conductors of metal mesh layer can be patterned so that conceptually flattening the metal mesh layer(s) and LEDs into the same layer, the conductors and the LEDs do not overlap. In some examples, the metal mesh wires in the metal mesh layer may overlap (at least partially) some of the LEDs 508, but may be thin enough or sparse enough to not obstruct a human's view of the LEDs. The metal mesh 540 can be formed in a diamond pattern around LEDs arranged in a diamond configuration. The pattern of LEDs forming the display pixels can be repeated across the touch screen to form the display. During fabrication, the metal mesh pattern can repeat across the touch screen to form a touch screen with uniform optical characteristics. It should be understood that the arrangement of LEDs and the corresponding metal mesh are merely an example, and other arrangements of LEDs and corresponding metal mesh patterns are possible. For example, the metal mesh can, in some examples, form a rectangular shape (or other suitable shape including polygonal shapes, etc.) around rectangular-shaped LEDs.

As described herein, the touch electrodes and/or routing can be formed from the metal mesh. To form the electrically isolated touch electrodes or electrically isolated groups of touch electrodes (e.g., groups of touch electrodes forming row electrodes or column electrodes), the metal mesh can be cut (e.g., chemically or laser etched, among other possibilities) to form a boundary between two adjacent touch electrodes, between two adjacent routing traces or between a routing trace and adjacent touch electrode. The cut in the metal mesh can electrically isolate the metal mesh forming a first touch electrode (or first group of touch electrodes) from the metal mesh forming a second touch electrode (or second group of touch electrodes). Similarly, cuts to the metal mesh can be made to electrically isolate the metal mesh forming a first touch electrode from a first routing trace or to electrically isolate the first routing trace from a second routing trace.

As described herein, in some examples, touch electrodes can be arranged in rows and columns formed in a first layer. In some examples, the touch electrodes can be arranged in a bar-and-stripe pattern. The column touch electrodes illustrated in FIGS. 6A-7 can be referred to as "bars" and the row touch electrodes can be formed from interconnected touch electrode segments that can be referred to as "stripes" (e.g., interconnected via bridges). FIGS. 6A-6E illustrate various example unit cells that can be repeated across a touch sensor panel to form a bar-and-stripe pattern according to examples of the disclosure. FIG. 7 illustrates an example of a touch sensor panel formed of nine unit cells (3×3) corresponding to the example unit cell of FIG. 6B.

Figure 6A:
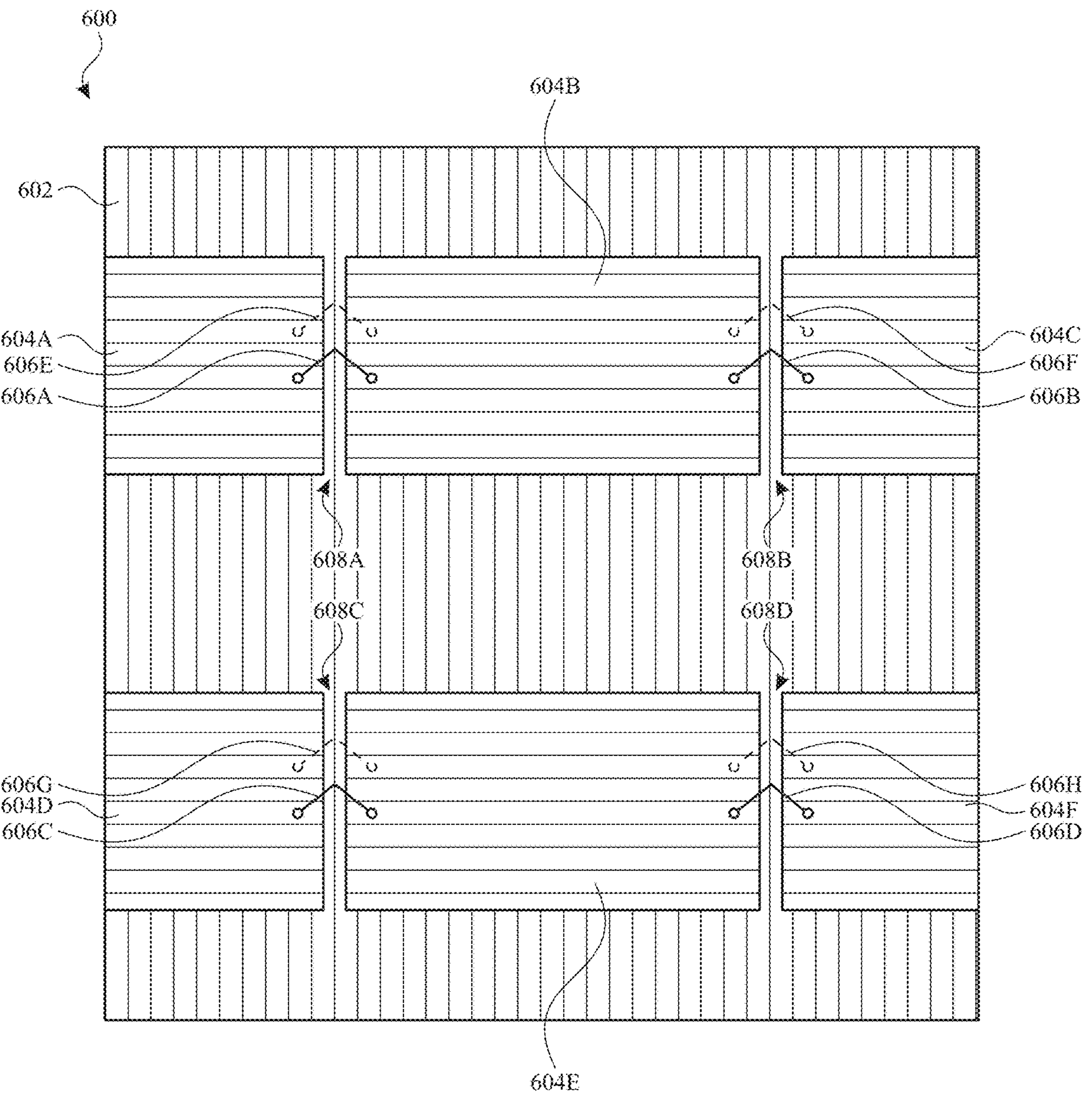
FIGS. 6A-6E illustrate various example unit cells that can be repeated across a touch sensor panel to form a bar-and-stripe pattern according to examples of the disclosure.
Figure 7:
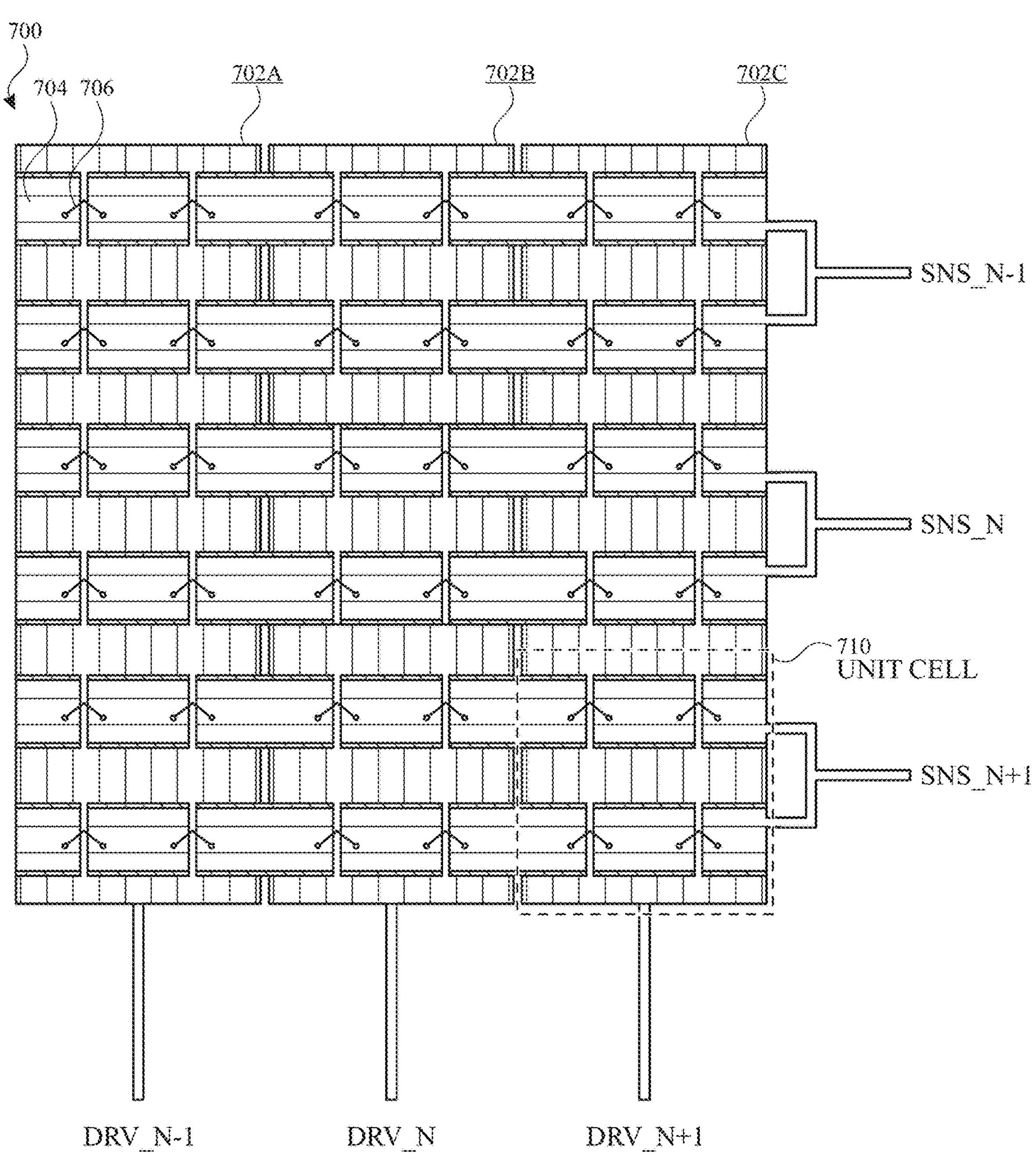
FIG. 7 illustrates an example of a touch sensor panel formed from unit cells according to examples of the disclosure.

FIG. 6A illustrates an example unit cell corresponding to a touch node according to examples of the disclosure. The unit cell 600 can include a portion of a column touch electrode 602 (corresponding to a "bar") and a portion of a row electrode formed from touch electrode segments 604A-604F (corresponding to "stripes"). A mutual capacitance between the column touch electrode and the row touch electrode can, which can change due to the proximity of an object (e.g., a finger) at a touch node corresponding to the unit cell. The column touch electrode 602 can correspond to a contiguous, electrically connected region, including regions around the touch electrode segments 604A-604F. The touch electrode segments 604A-604F of the row electrode can be electrically connected using one or more bridges 606A-606G that bridge across the neck regions 608A-608D of the column touch electrode 602 between the touch electrode segments 604A-604F. In some examples, one bridge can be used to interconnect two touch electrode segments (e.g., bridges 606A-606D). In some examples, more than one bridge can be used to interconnect two touch electrode segments (e.g., bridges 606A and 606E, bridges 606B and 606F, etc.). Bridge-connected touch electrodes segments 604A-604C (e.g., corresponding to a first "stripe" in the bar-and-stripe pattern) and bridge-connected touch electrode segments 604D-604F (e.g., corresponding to a second "stripe" in the bar-and-stripe pattern) can be electrically connected outside of the unit cell area (e.g., as illustrated in FIG. 7). In some examples, the first and second stripes can be electrically connected to one another within the unit cell area (e.g., with bridges). In some examples, bridges 606A-606G may be achieved using wire bonds or other conductors formed without using a metal mesh layer. In some examples, bridges 606A-606G may be formed using a metal mesh layer (e.g., metal mesh layer 516) different than the metal mesh layer used to form column touch electrode 602 and touch electrode segments 604A-604F (e.g., metal mesh layer 506). The connection between the metal mesh layers can also include a via (or other interconnection), in some examples, to make connections between the first metal mesh layer and the second metal mesh layer. It is understood that bridges 606A-606G may include multiple metal mesh wires (e.g., increasing the width of the bridge) to meet the resistance requirements for the rows touch electrodes.

The distribution of the touch electrode segments within the unit cell can improve the touch signal levels (and therefore the signal-to-noise ratio (SNR) for touch sensing) because mutual capacitance in a single-layer touch sensor panel can be a function of the distance between the touch electrodes that are driven and sensed. For example, the mutual capacitances can be greater along the boundaries between a touch electrode that is driven and a touch electrode that is sensed as compared with the center of the two touch electrodes. Thus, by dividing the row electrode into multiple stripes (thereby reducing the maximum spacing between a region of the drive electrode and a region of a sense electrode in the unit cell), the signal measured at the unit cell can be increased relative to other touch electrode patterns (e.g., a diamond touch electrode pattern, etc.). The impact of the distributed bar-and-stripe pattern on the mutual capacitance can provide increased modulation between finger and the sensor. Additionally, the distribution of the touch electrode segments can provide improved linearity of the touch signal detected as an object moves across the touch sensor panel (e.g., more uniform signal measured by an object, independent on the location of the object on the touch sensor panel). Improved linearity can provide various benefits of improved touch performance that include more precise and accurate touch location detection, reduced wobble, etc.

Figure 6B:
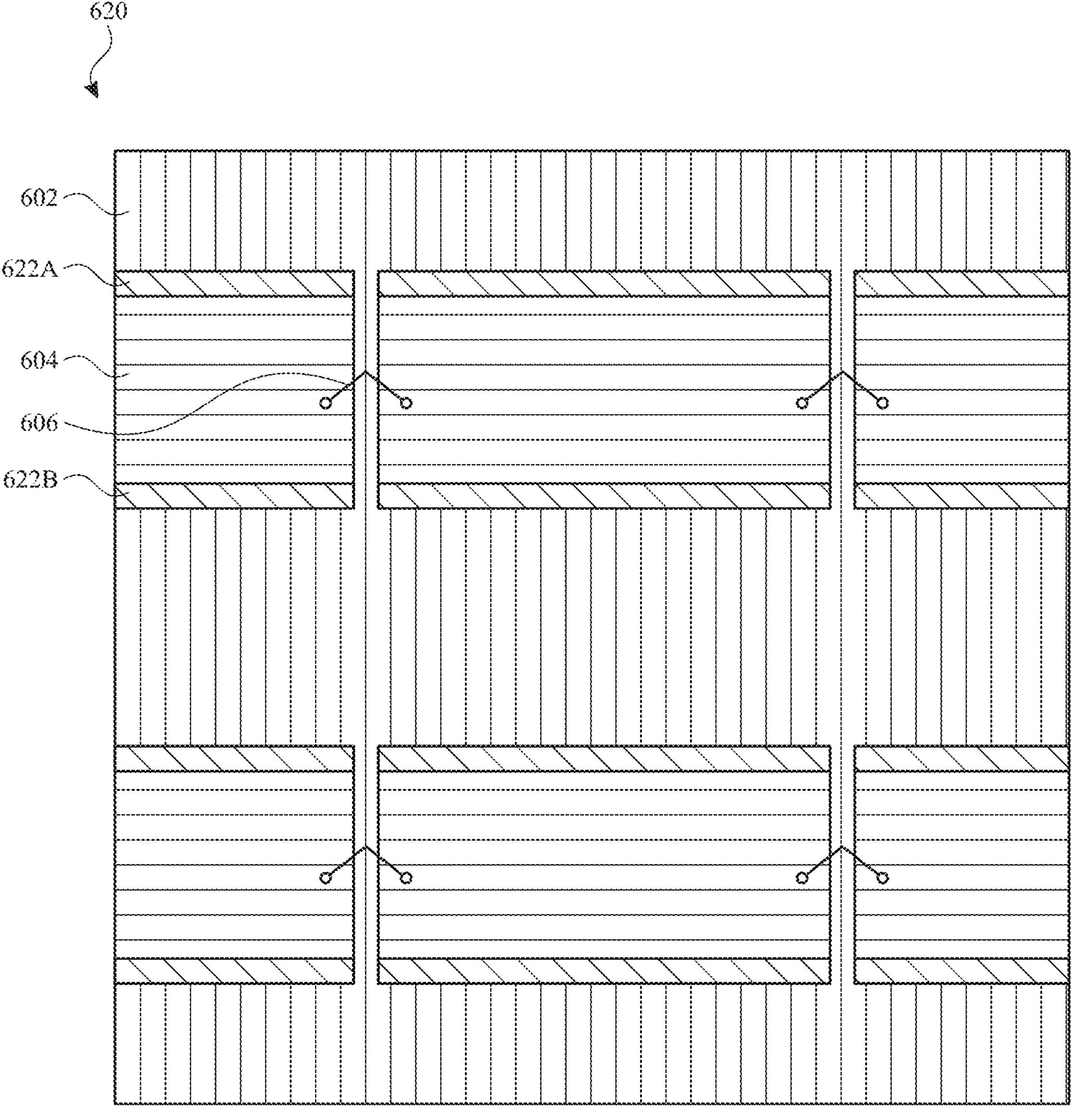

FIG. 6B illustrates an example unit cell corresponding to a touch node according to examples of the disclosure. The unit cell 620 can include a portion of a column touch electrode and a portion of a row electrode formed from touch electrode segments as described with reference to FIG. 6A, including column touch electrode 602, touch electrode segments (e.g., such as representative touch electrode segment 604), and interconnections (e.g., such as bridge 606) over neck regions between touch electrode segments. For brevity, the details of these features are not repeated again here (and for ease of illustration only one bridge is illustrated between segments). Unlike FIG. 6A, unit cell 620 can include buffering regions between portions of column touch electrode 602 and touch electrode segments. The buffer regions can be conductive material that is floating (or grounded or driven with a potential, in some examples). The buffer region can reduce the baseline mutual capacitance of the touch node by increasing the distance between the drive and sense regions. For example, touch electrode segment 604 in FIG. 6B can be separated on a first boundary with column touch electrode 602 by buffer region 622A and can be separated on a second boundary with column electrode 602 by buffer region 622B. The remaining touch electrode segments illustrated in FIG. 6B can include similar buffer regions between the column touch electrode 602 and the touch electrode segments. Although FIG. 6B illustrates buffer regions on two sides of each of the touch electrode segments, it is understood that in some examples, the buffering can be on fewer sides (one or no sides) or more sides (three or four sides) of the touch electrode segments. Increasing the separation (e.g., surface area and/or width) can further reduce the baseline capacitance, whereas decreasing the separation can increase the baseline capacitance. In some examples, as illustrated in FIG. 6B, the neck region can be free of buffer regions to reduce the impedance of the column touch electrode 602. Additionally, although buffer regions are shown as continuous along a respective boundary of a touch electrode segment, that the buffer region (e.g., buffer region 622A) can be discontinuous so as to be present in one or more segments along a portion of the boundary. Additionally, although similar buffer regions are shown on all touch electrode segments in unit cell 620, it is understood that different touch electrode segments in a unit cell can have different numbers of buffer regions or buffer regions with different properties (dimensions, distributions, etc.).

Figure 6C:
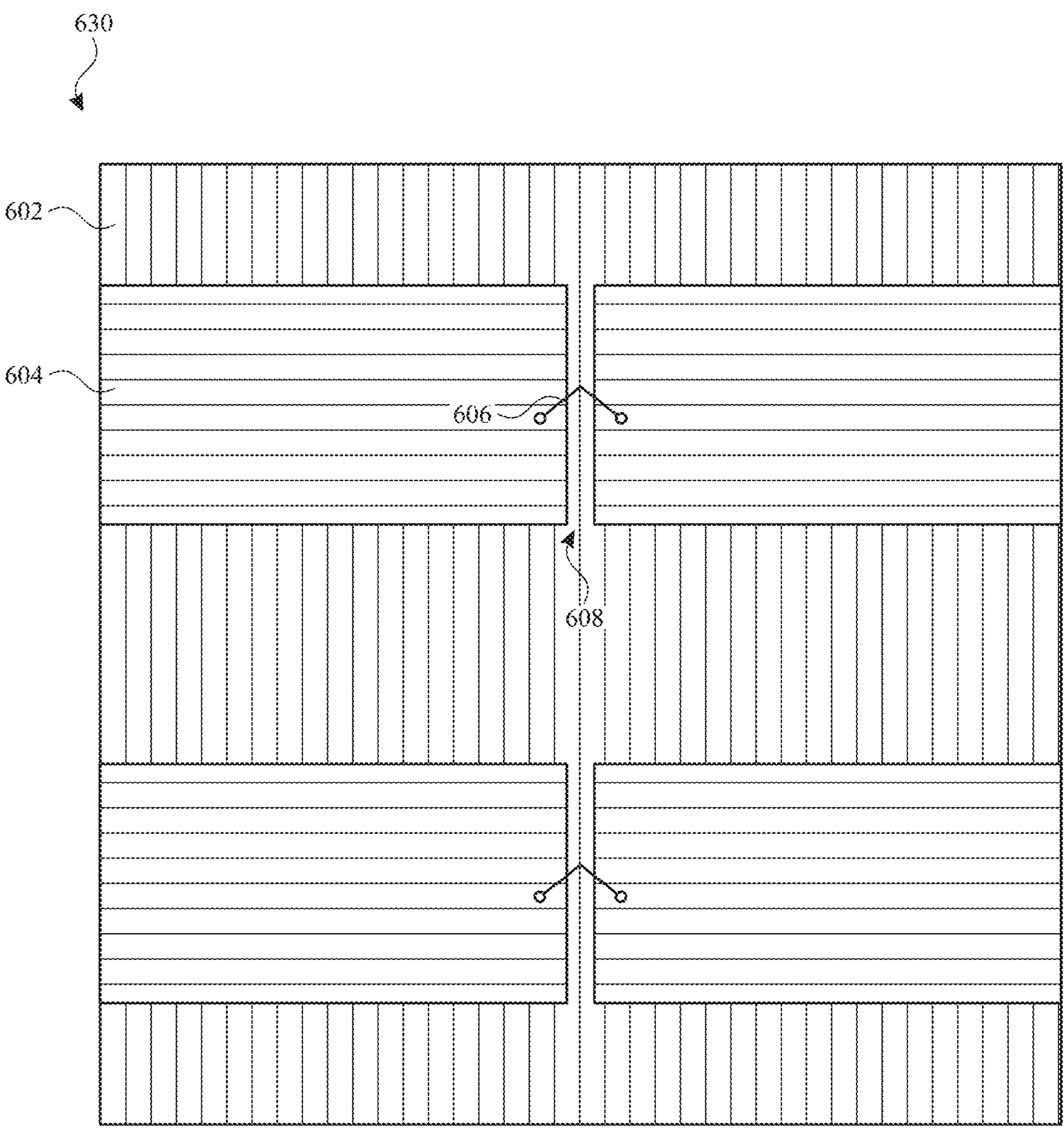

FIG. 6C illustrates an example unit cell corresponding to a touch node according to examples of the disclosure. The unit cell 630 can include a portion of a column touch electrode and a portion of a row electrode formed from touch electrode segments as described with reference to FIG. 6A, including column touch electrode 602, touch electrode segments (e.g., such as representative touch electrode segment 604), and interconnections (e.g., such as bridge 606) over neck regions between touch electrode segments. For brevity, the details of these features are not repeated here. Unlike FIG. 6A, unit cell 630 can include fewer touch electrode segments and fewer interconnections between touch electrode segments. For example, FIG. 6C includes four touch electrode segments, rather than the six touch electrode segments of FIG. 6A. Likewise, FIG. 6C includes two interconnections, rather than the four interconnections of FIG. 6A. Reducing the number of interconnections can reduce the baseline mutual capacitance of the touch node because interconnections of bridges 606 can result in increased mutual capacitance due to the proximity between the drive and sense regions at these interconnections. Additionally, reducing the number of interconnections can reduce the resistance of the row touch electrodes. Although FIG. 6C illustrates two interconnections between four touch electrode segments, it should be understood that fewer or more interconnections and touch electrode segments can be employed. In some examples, to compensate for the reduced number of neck portions in FIG. 6C compared with FIG. 6A (e.g., connecting different portions of column touch electrode 602), the width of the neck portion can be increased in FIG. 6C relative to FIG. 6A to avoid increasing the resistance of the column touch electrode.

Figure 6D:
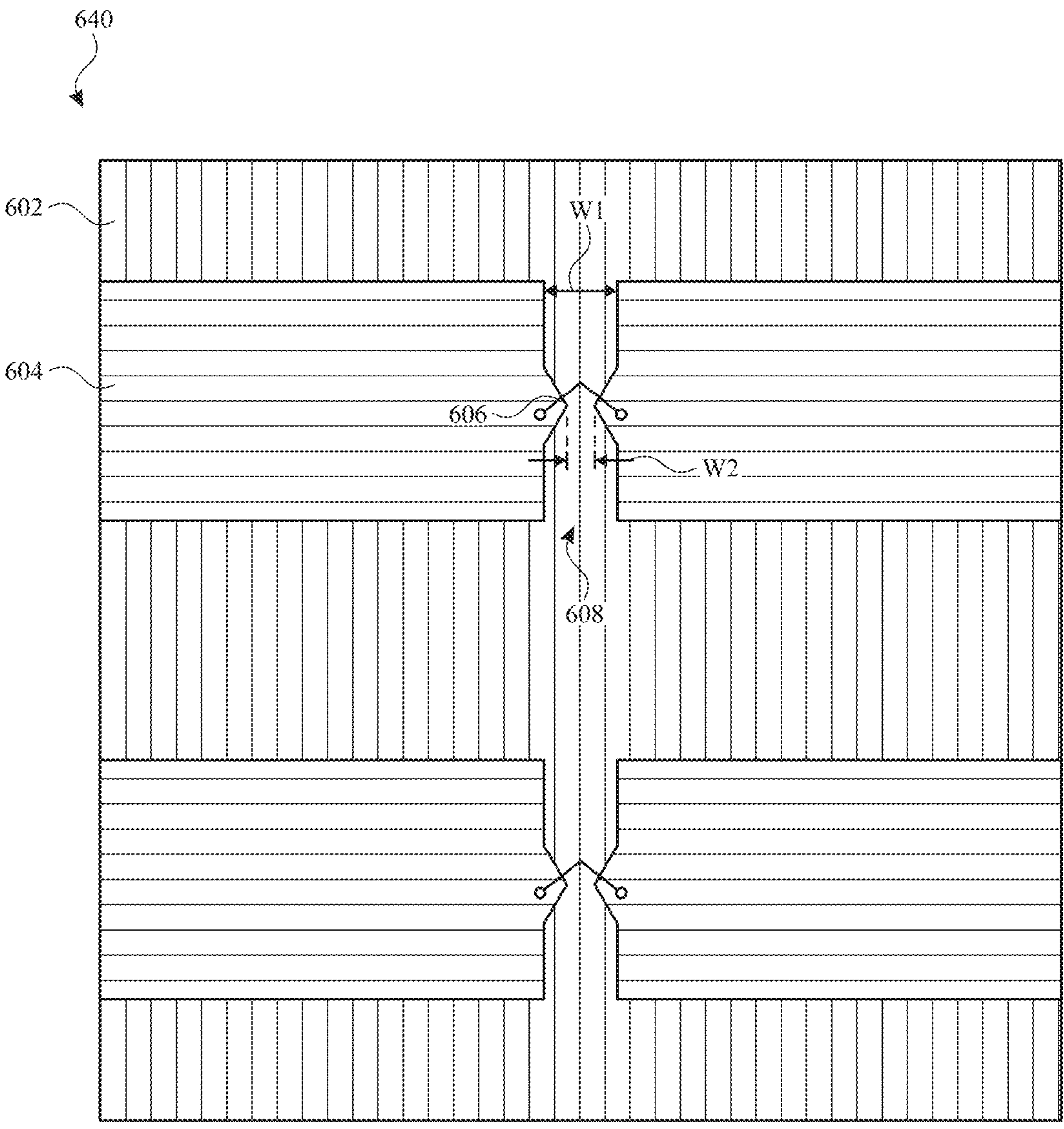

FIG. 6D illustrates an example unit cell corresponding to a touch node according to examples of the disclosure. The unit cell 640 can include a portion of a column touch electrode and a portion of a row electrode formed from touch electrode segments as described with reference to FIG. 6A, including column touch electrode 602, touch electrode segments (e.g., such as representative touch electrode segment 604), and interconnections (e.g., such as bridge 606) over neck regions 608 between touch electrode segments. For brevity, the details of these features are not repeated here. Unlike FIG. 6A, unit cell 640 can include a tapered neck region between touch electrode segments. Neck region 608 illustrated in FIG. 6D can taper from a first width $W_1$ away from the interconnection of bridge 606 to a second width $W_2$ at (or closer to) the location of the interconnection of bridge 606. The second width $W_2$ can be less than the first width $W_1$. As a result, the interconnection of bridge 606 can be shorted, which can reduce the baseline mutual capacitance for the touch node. However, by tapering neck region 608, the resistance of column electrode 602 can be lower than in the configuration of FIG. 6D compared with narrowing the entire neck region to width $W_2$. The tapering forming a triangle shape as illustrated in FIG. 6D is an example of tapering, but any linear, non-linear or other narrowing of the neck region can be used to shrink the size of the interconnect. The neck region between other touch electrode segments can be tapered (or not) using the same (or different) tapers.

Figure 6E:
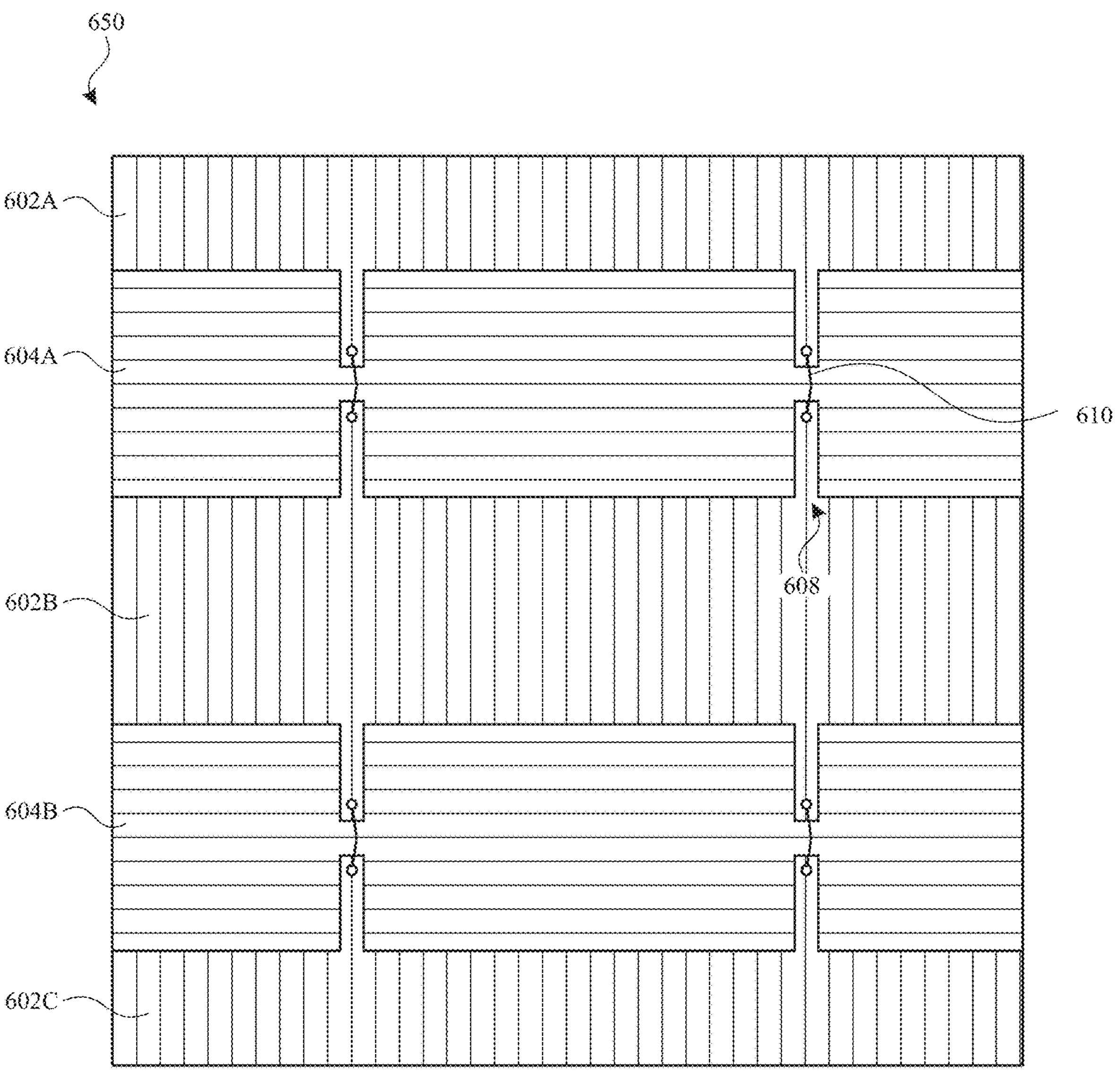

FIG. 6E illustrates an example unit cell corresponding to a touch node according to examples of the disclosure. The unit cell 650 can include a portion of a column touch electrode and a portion of a row electrode. However, unlike the description of FIG. 6A, the column touch electrode can be formed from touch electrode segments 602A-602C that can be interconnected by bridges 610 in the neck region 608, and the row touch electrode can be formed from stripes 604A-604B, each of which can be contiguous (e.g., and may be interconnected in the border area). In some examples, the bridges 610 can be implemented may be achieved using wire bonds or other conductors formed without using a metal mesh layer. In some examples, bridges 610 may be formed using a metal mesh layer (e.g., metal mesh layer 516) different than the metal mesh layer used to form the column touch electrode segments 602A-602C and row touch electrode stripes 604A-604B (e.g., metal mesh layer 506). The connection between the metal mesh layers can also include a via (or other interconnection), in some examples, to make connections between the first metal mesh layer and the second metal mesh layer. It is understood that bridges 610 may include multiple metal mesh wires (e.g., increasing the width of the bridge) to meet the resistance requirements for the column touch electrodes. It should be understood that other features illustrated in FIGS. 6A-6D for row touch electrodes formed from touch electrode segments can be implemented for column touch electrodes formed from touch electrode segments (e.g., multiple bridges, tapered neck regions, etc.).

In some examples, the neck region 608 can include bridges for both column touch electrodes and row touch electrodes. Some of the bridges can be used to electrically connect touch electrode segments (e.g., as described with reference to FIG. 6A and FIG. 6E for row and column touch electrodes, respectively), and some bridges can be used to electrically connect regions of column touch electrodes or row touch electrodes to further reduce the impedance of the column touch electrodes or row touch electrodes. For example, unit cell 600 can be modified to include a bridge similar to bridge 610 of FIG. 6E, but electrically connecting regions of column touch electrode 602 to further reduce impedance of column touch electrode 602 (rather than to bridge column electrode segments as in FIG. 6E, because column touch electrode 602 in FIG. 6A can be contiguous). In a similar manner, unit cell 650 can be modified to include a bridge similar to bridges in FIG. 6A to reduce impedance of row touch electrodes. In some examples, the bridges (in a second metal mesh layer) between different regions of a contiguous electrode (e.g., in the first metal mesh layer) can be restricted to the neck region 608 where the narrowness of the touch electrode can be an impedance bottleneck. In some examples, bridges connecting different regions of a contiguous electrode can extend beyond neck region 608.

It should be understood that although unit cells 600, 620, 630, 640 and 650 in FIGS. 6A-6E illustrate two stripes in the unit cell (two rows of interconnected touch electrode segments), that the number of stripes can be greater than two (e.g., three, four, etc.) or less than two (e.g., one) in some examples. It should be understood that unit cells 600, 620, 630, 640 and 650 are example unit cells. The number and dimensions of touch electrode segments, the number and dimensions of interconnections between touch electrode segments (and between portions of a column touch electrodes), and the thickness and dimensions of the neck region can be varied according to design considerations, including trading off the impedance of the row and/or column touch electrodes and the baseline capacitance for the unit cell, including an amount of desired for touch signal, and including the linearity of the touch signals across the touch sensor panel. Although described separately above, one or more of the features illustrated in FIGS. 6A-6E can be combined in some examples. For example, the multiple bridges of FIG. 6A, the buffer regions of FIG. 6B, the reduced number of interconnections of FIG. 6C, and/or the shape (dimensions) of the neck region of FIG. 6D. It should be understood that although column touch electrodes are illustrated as contiguous and row touch electrodes are illustrated as formed of touch electrode segments, in some examples, row touch electrodes can be contiguous and column touch electrodes can be formed of touch electrode segments. It should be understood that although unit cells 600, 620, 630, 640 and 650 have uniform widths, that the width of "strips" or "bars" in a unit cell may be non-uniform.

FIG. 7 illustrates an example of a touch sensor panel formed from unit cells according to examples of the disclosure. For example, touch sensor panel 700 can include nine unit cells corresponding to unit cell 710 (3×3 touch nodes) corresponding to the example unit cell of FIG. 6B (e.g., corresponding to unit cell 620). For brevity, the details of the unit cell described with reference to FIG. 6B are not repeated. As illustrated in FIG. 7, touch sensor panel 700 can include three column touch electrodes 702A-702C ("bars") that can be driven during touch sensing operation (e.g., by drive signals provided by routing traces labeled "DRV_N−1", "DRV_N" and "DRV_N+1"). Touch sensor panel 700 can also include three row touch electrodes. Each of the row touch electrodes illustrated in FIG. 7 can include two "stripes" formed of touch electrode segments 704. The touch electrode segments 704 for each "stripe" can be interconnected within the touch sensor panel active area (e.g., in the visible area of the display in a touch screen) by bridges 706 (e.g., metal mesh). Although one bridge 706 between touch electrodes segments is illustrated in FIG. 7, it is understood that additional bridges can be used to improve electrostatic discharge protection, improve mechanical and/or electrical reliability of the connection and/or reduce impedance of the row touch electrode, Additionally, although not shown in FIG. 7, additional bridges (e.g., as illustrated in and described with reference to FIG. 6E) can be used to provide the same or similar benefits for column touch electrodes. The two "stripes" of a row electrode can be connected in a border area (e.g., outside of the touch sensor panel active area/outside the visible area of the display) by conductive traces (e.g., metal mesh or otherwise). Each row electrode can be sensed during touch sensing operation (e.g., by sense channels coupled to routing traces labeled "SNS_N−1", "SNS_N", "SNS_N+1"). The adjacencies of a respective column touch electrode and a respective row touch electrode can form a respective touch node/unit cell of touch sensor panel 700.

Although the example unit cell of FIG. 6B is illustrated in unit cell 710 (e.g., including a buffer region), it should be understood that alternative unit cells can be used, such as the unit cells of FIGS. 6A, 6C, 6D, 6E or some combination of some or all of the unit cells of FIGS. 6A-6E (or other unit cells according to the features described herein). Additionally, although a 3×3 grouping of unit cells is illustrated, it is understood that the panel can be of a smaller or larger size (e.g., 2×2, 4×4, 5×5, 10×10, 16×16, etc.) Additionally, although FIG. 7 illustrates column touch electrodes that are driven and rows touch electrodes that are sensed, in some examples, the row touch electrodes can be driven and the column touch electrodes can be sensed.

Figure 8:
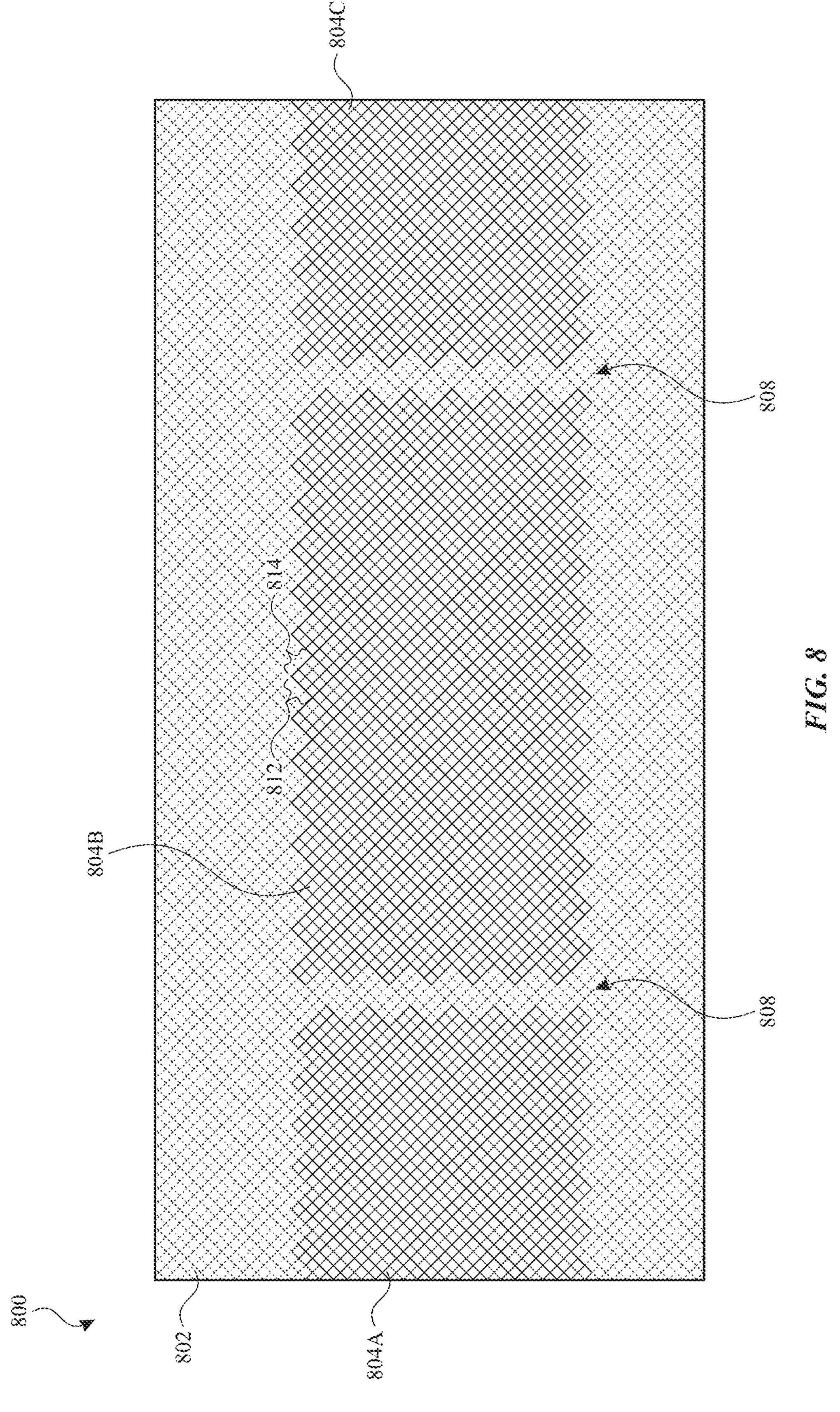
FIG. 8 illustrates a metal mesh corresponding to a portion of unit cell according to examples of the disclosure.

Although FIGS. 6A-7 illustrate rectangular electrodes for row and column touch electrodes with linear boundaries, it should be understood that due to the pattern of metal mesh and to reduce the visibility of the metal mesh, the true shape of touch electrodes and their boundaries may not be rectangular. FIG. 8 illustrates a metal mesh corresponding to a portion of unit cell of FIG. 6A according to examples of the disclosure. Metal mesh 800 can correspond, for example, to half of unit cell 600 of FIG. 6A. Metal 800 mesh can include a first metal mesh portion 802 corresponding to column touch electrode 602 and second metal mesh portions 804A-804C corresponding to touch electrode segments 604A-604C. Due to the diamond pattern (with 45 degree angles) and to reduce the visibility of the boundaries of the touch electrodes, the first and second metal mesh portions can be non-linear along the boundaries. In some examples, the boundaries between the touch electrodes can be a zig-zag or wave-like pattern. For example, as illustrated in FIG. 8, the boundary between first metal mesh portion 802 and second metal mesh portion 804B can have a zig-zag pattern where the length of segments 812 and 814 can each be a length of three metal mesh wires. A similar pattern can be implemented for the other boundaries illustrated in FIG. 8 (with slight variations at the corners for continuity according to the geometry of the pattern). It should be understood that the length of segments 812 and 814 are exemplary, and other lengths are possible. Additionally, the lengths can be different at different points along a boundary or different between two different boundaries. In some examples, rather than defining the pattern by the lengths of segments such as segments 812 and 814, the zig-zag pattern can be defined by other parameters.

The touch electrodes (and buffer regions) can be formed from metal mesh in the metal mesh layer (e.g., corresponding to metal mesh layer 506) by cuts or electrical discontinuities in the metal mesh wires between the touch electrodes (and/or buffer regions). In some examples, the cuts or electrical discontinuities can be formed at midpoints of metal mesh wires (or otherwise dividing one or more metal mesh wires), rather than having cuts or electrical discontinuities at vertices of two metal mesh wires in the metal mesh pattern.

In some examples, dummy cuts can further reduce visibility of the metal mesh boundary cuts. A dummy cut can interrupt one electrical path between two portions of the metal mesh (on either side of the dummy cut), without electrically isolating the metal mesh due to one or more other electrical paths between two portions of the metal mesh (on either side of the dummy cut). In other words, the portions of the metal mesh can remain at substantially the same electrical potential despite the internal cuts because the portions of the metal mesh are electrically connected. For example, dummy cuts can be made within the first metal mesh portion 802 and/or in the second metal mesh portions 804A-804C that form physical separations in the metal mesh without electrically separating the metal mesh in each respective portion. In some examples, the dummy cuts can form a pattern that can be repeated across each of the touch electrodes. For example, a dummy cut unit (e.g., a pattern of discontinuities) can be defined, and the dummy cut unit can be repeated across the touch screen to form the dummy cuts. In some examples, dummy cuts can also be implemented for buffer regions (e.g., buffer region 622A-622B) between the column touch electrodes and touch electrode segments.

In some examples, dummy cuts in the first metal mesh portion 802 can be restricted to certain regions. For example, dummy cuts may be excluded, or limited, in neck regions 808 of the first metal mesh portion 802. Excluding (or limiting) dummy cuts in the neck regions 808 can be beneficial in some instances to reduce the impedance of the column touch sensor (due to the narrow width of the metal mesh in the neck regions).

Although FIGS. 6A-8 illustrate column touch electrodes and row touch electrodes disposed in a first metal mesh layer (e.g., corresponding to metal mesh layer 506) that may include interconnections in a second metal mesh layer (e.g., corresponding to metal mesh layer 516), it should be understood that in some examples, the column touch electrodes can be disposed in one layer and the row touch electrodes can be disposed in another layer (e.g., in a double-sided touch senor configuration as illustrated in FIG. 4A).

Therefore, according to the above, some examples of the disclosure are directed to a touch screen comprising: a display having an active area; a plurality of touch electrodes formed of metal mesh disposed in a first metal mesh layer disposed over the active area of the display; and a plurality of bridges formed at least partially in a second metal mesh layer different from the first metal mesh layer. The plurality of touch electrodes can include one or more contiguous column touch electrodes and can include one or more row touch electrodes formed from a plurality of touch electrode segments. Abridge of the plurality of bridges electrically can couple two of the touch electrode segments along a first axis parallel to the one or more row touch electrodes. Additionally or alternatively to the examples disclosed above, in some examples, one of the one or more row touch electrodes can include a two dimensional array of touch electrode segments of the plurality of touch electrode segments. A first group of the touch electrode segments disposed along the first axis can be electrically coupled by one or more first bridges of the plurality of bridges, and a second group of the touch electrode segments, different from and disposed parallel to the first group of the touch electrode segments, can be electrically coupled by one or more second bridges of the plurality of bridges. Additionally or alternatively to the examples disclosed above, in some examples, the first group of the touch electrodes segments and the second group of the touch electrode segments can be electrically coupled via a conductor disposed in a border region around the active area of the display. Additionally or alternatively to the examples disclosed above, in some examples, a respective touch node of the touch screen corresponding to adjacency of one of the one or more column touch electrodes and the one of the one or more row touch electrodes can include three touch electrode segments of the first group that can be electrically coupled by two bridges of the plurality of bridges and the second group can include three touch electrode segments of the second group that can be electrically coupled by another two bridges of the plurality of bridges. Additionally or alternatively to the examples disclosed above, in some examples, a respective touch node of the touch screen corresponding to adjacency of one of the one or more column touch electrodes and the one of the one or more row touch electrodes can include two touch electrode segments of the first group that can be electrically coupled by a first bridge of the plurality of bridges and the second group can include two touch electrode segments of the second group that can be electrically coupled by a second bridge of the plurality of bridges. Additionally or alternatively to the examples disclosed above, in some examples, the touch screen can further comprise: one or more buffer electrodes disposed between one or more portions of the one or more column touch electrode and one or more portions of the plurality of touch electrode segments. The one or more buffer electrodes can be floating or grounded or driven with a potential. Additionally or alternatively to the examples disclosed above, in some examples, a neck region between two of the plurality of touch electrode segments tapers from a first width to a second width less than the first width. A length of the bridge of the plurality of bridges that electrically couples the two of the touch electrode segments across the neck region can be greater than or equal to the second width and less than the length of the first width. Additionally or alternatively to the examples disclosed above, in some examples, electrical discontinuities in the metal mesh disposed in the first metal mesh layer can form boundaries between one of the column touch electrodes and one or more touch electrode segments of the plurality of touch electrode segments. The boundaries can be in a zig-zag pattern. Additionally or alternatively to the examples disclosed above, in some examples, the metal mesh of one of the column touch electrodes can be at a same electrical potential (or substantially the same electrical potential), and the metal mesh of the one of the column touch electrodes can include electrical discontinuities (dummy cuts) internal to an area of the one of the column touch electrodes. Additionally or alternatively to the examples disclosed above, in some examples, the metal mesh of one of the plurality of touch electrode segments can be at a same electrical potential (or substantially the same electrical potential), and the metal mesh of the one of the plurality of touch electrode segments can include electrical discontinuities (dummy cuts) internal to an area of the one of the plurality of touch electrode segments. Additionally or alternatively to the examples disclosed above, in some examples, a pattern of electrical discontinuities (dummy cuts) internal to an area of one of the plurality of touch electrodes can repeat across the area of the one of the plurality of touch electrodes. Additionally or alternatively to the examples disclosed above, in some examples, the metal mesh of one of the column touch electrodes can be at a same electrical potential (or substantially the same electrical potential), and a first region of the metal mesh of the one of the column touch electrodes can include electrical discontinuities (dummy cuts) internal to an area of the one of the column touch electrodes and a second region of the metal mesh of the one of the column touch electrodes may not include electrical discontinuities (dummy cuts) internal to the area of the one of the column touch electrodes. The second region can correspond to a neck region between two of the plurality of touch electrode segments.

Some examples of the disclosure are directed to a touch screen comprising: a display having an active area; a plurality of column touch electrodes formed of metal mesh disposed in a first metal mesh layer; and a plurality of row touch electrodes formed of metal mesh disposed in a second metal mesh layer different from the first metal mesh layer. A row touch electrode of the plurality of row touch electrodes (or all of the row touch electrodes) can include at least two electrodes disposed over the active area of the display that can be electrically coupled via a conductor disposed in a border region around the active area of the display.

Some examples of the disclosure are directed to a touch-sensitive device. The touch-sensitive device can include an energy storage device (e.g., a battery) and/or (wired or wireless) communication circuitry. The touch-sensitive device can include a touch controller and a display controller. The touch-sensitive device can also include a touch screen. The touch screen can comprise: a display having an active area; a plurality of touch electrodes formed of metal mesh disposed in a first metal mesh layer disposed over the active area of the display; and a plurality of bridges formed at least partially in a second metal mesh layer different from the first metal mesh layer. The plurality of touch electrodes can include one or more contiguous column touch electrodes and can include one or more row touch electrodes formed from a plurality of touch electrode segments. A bridge of the plurality of bridges electrically can couple two of the touch electrode segments along a first axis parallel to the one or more row touch electrodes. Additionally or alternatively to the examples disclosed above, in some examples, one of the one or more row touch electrodes can include a two dimensional array of touch electrode segments of the plurality of touch electrode segments. A first group of the touch electrode segments disposed along the first axis can be electrically coupled by one or more first bridges of the plurality of bridges, and a second group of the touch electrode segments, different from and disposed parallel to the first group of the touch electrode segments, can be electrically coupled by one or more second bridges of the plurality of bridges. Additionally or alternatively to the examples disclosed above, in some examples, the first group of the touch electrodes segments and the second group of the touch electrode segments can be electrically coupled via a conductor disposed in a border region around the active area of the display. Additionally or alternatively to the examples disclosed above, in some examples, a respective touch node of the touch screen corresponding to adjacency of one of the one or more column touch electrodes and the one of the one or more row touch electrodes can include three touch electrode segments of the first group that can be electrically coupled by two bridges of the plurality of bridges and the second group can include three touch electrode segments of the second group that can be electrically coupled by another two bridges of the plurality of bridges. Additionally or alternatively to the examples disclosed above, in some examples, a respective touch node of the touch screen corresponding to adjacency of one of the one or more column touch electrodes and the one of the one or more row touch electrodes can include two touch electrode segments of the first group that can be electrically coupled by a first bridge of the plurality of bridges and the second group can include two touch electrode segments of the second group that can be electrically coupled by a second bridge of the plurality of bridges. Additionally or alternatively to the examples disclosed above, in some examples, the touch screen can further comprise: one or more buffer electrodes disposed between one or more portions of the one or more column touch electrode and one or more portions of the plurality of touch electrode segments. The one or more buffer electrodes can be floating or grounded or driven with a potential. Additionally or alternatively to the examples disclosed above, in some examples, a neck region between two of the plurality of touch electrode segments tapers from a first width to a second width less than the first width. A length of the bridge of the plurality of bridges that electrically couples the two of the touch electrode segments across the neck region can be greater than or equal to the second width and less than the length of the first width. Additionally or alternatively to the examples disclosed above, in some examples, electrical discontinuities in the metal mesh disposed in the first metal mesh layer can form boundaries between one of the column touch electrodes and one or more touch electrode segments of the plurality of touch electrode segments. The boundaries can be in a zig-zag pattern. Additionally or alternatively to the examples disclosed above, in some examples, the metal mesh of one of the column touch electrodes can be at a same electrical potential (or substantially the same electrical potential), and the metal mesh of the one of the column touch electrodes can include electrical discontinuities (dummy cuts) internal to an area of the one of the column touch electrodes. Additionally or alternatively to the examples disclosed above, in some examples, the metal mesh of one of the plurality of touch electrode segments can be at a same electrical potential (or substantially the same electrical potential), and the metal mesh of the one of the plurality of touch electrode segments can include electrical discontinuities (dummy cuts) internal to an area of the one of the plurality of touch electrode segments. Additionally or alternatively to the examples disclosed above, in some examples, a pattern of electrical discontinuities (dummy cuts) internal to an area of one of the plurality of touch electrodes can repeat across the area of the one of the plurality of touch electrodes. Additionally or alternatively to the examples disclosed above, in some examples, the metal mesh of one of the column touch electrodes can be at a same electrical potential (or substantially the same electrical potential), and a first region of the metal mesh of the one of the column touch electrodes can include electrical discontinuities (dummy cuts) internal to an area of the one of the column touch electrodes and a second region of the metal mesh of the one of the column touch electrodes may not include electrical discontinuities (dummy cuts) internal to the area of the one of the column touch electrodes. The second region can correspond to a neck region between two of the plurality of touch electrode segments.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:

a display having an active area; and a plurality of touch electrodes formed over the active area of the display, comprising:

a contiguous column touch electrode in a first layer; and a row touch electrode including a plurality of touch electrode segments in the same first layer as the contiguous column touch electrode;

wherein:

each of the plurality of touch electrode segments is separated from the other touch electrode segments in the first layer by the contiguous column touch electrode;

the plurality of touch electrode segments includes pairs of touch electrode segments that have respective first and second edges that face each other; and one or more portions of the contiguous column touch electrode separates the respective first and second edges of the pairs of touch electrode segments, including a first portion that separates the respective first and second edges of a first pair of touch electrode segments and a second portion that separates the respective first and second edges of a second pair of touch electrode segments, different from the first pair of touch electrode segments.

2. The touch screen of claim 1, wherein the plurality of touch electrode segments includes a two-dimensional array of touch electrode segments.

3. The touch screen of claim 2, wherein the two-dimensional array of the touch electrode segments comprises:

a first one-dimensional array of touch electrode segments; and a second one-dimensional array of touch electrode segments electrically isolated from the first one-dimensional array within the active area of the display.

4. The touch screen of claim 3, wherein:

the contiguous column touch electrode is a first contiguous column touch electrode between a first vertical boundary and a second vertical boundary;

the plurality of touch electrodes further comprises a second contiguous column touch electrode between a third vertical boundary and a fourth vertical boundary; and a first touch electrode segment of the first one-dimensional array of touch electrode segments includes a first side and a second side opposite from the first side, the first side entirely within a first region, and the second side entirely within a second region.

5. The touch screen of claim 3, wherein:

the contiguous column touch electrode is in a region between a first vertical boundary and a second vertical boundary;

a first touch electrode segment of the first one-dimensional array of touch electrode segments includes a first side and a second side opposite from the first side; and the first side and second side are entirely within the region.

6. The touch screen of claim 1, wherein the first layer comprises a metal mesh and the plurality of touch electrodes is formed from the metal mesh, the touch screen further comprising:

a plurality of bridges formed at least partially in a second layer, different from the first layer, wherein the plurality of bridges includes a bridge that electrically couples a pair of touch electrode segments of the plurality of touch electrode segments of the row touch electrode.

7. The touch screen of claim 6, wherein the plurality of touch electrode segments includes a two-dimensional array of touch electrode segments, comprising:

a first one-dimensional array of touch electrode segments; and a second one-dimensional array of touch electrode segments, wherein the second one-dimensional array of touch electrode segments is electrically isolated from the first one-dimensional array of touch electrode segments within the active area of the display, wherein:

the first one-dimensional array of touch electrode segments includes a first group of touch electrode segments that are electrically coupled by one or more first bridges of the plurality of bridges;

the second one-dimensional array of touch electrode segments includes a second group of touch electrode segments that are electrically coupled by one or more second bridges of the plurality of bridges; and the first one-dimensional array of touch electrode segments is arranged in parallel with the second one-dimensional array of touch electrode segments.

8. The touch screen of claim 7, wherein:

the first group of touch electrode segments and the second group of touch electrode segments are electrically coupled via a conductor disposed in a border region outside the active area of the display.

9. The touch screen of claim 7, wherein:

a touch node of the touch screen corresponds to an adjacency of the contiguous column touch electrode and a portion of the plurality of touch electrode segments of the row touch electrode; and the portion of the plurality of touch electrode segments comprises:

three touch electrode segments of the first group that are electrically coupled by two bridges of the first bridges; and three touch electrode segments of the second group that are electrically coupled by two bridges of the second bridges.

10. The touch screen of claim 7, wherein:

a touch node of the touch screen corresponds to an adjacency of the contiguous column touch electrode and a portion of the plurality of touch electrode segments of the row touch electrode; and the portion of the plurality of touch electrode segments comprises:

two touch electrode segments of the first group that are electrically coupled by a first bridge of the first bridges; and two touch electrode segments of the second group that are electrically coupled by a second bridge of the second bridges.

11. The touch screen of claim 1, further comprising:

a buffer electrode disposed between a portion of the contiguous column touch electrode and a portion of the plurality of touch electrode segments, wherein the buffer electrode is floating, grounded, or driven with a potential.

12. The touch screen of claim 1, wherein the first layer comprises a first metal mesh layer, and wherein the plurality of touch electrodes is formed of metal mesh disposed in the first metal mesh layer disposed over the active area of the display, and the touch screen further comprises:

a plurality of bridges formed at least partially in a second metal mesh layer different from the first metal mesh layer, wherein a bridge of the plurality of bridges electrically couples two of the plurality of touch electrode segments along a first direction;

a neck region between two of the plurality of touch electrode segments that tapers from a first width to a second width less than the first width; and a length of the bridge of the plurality of bridges that electrically couples the two of the plurality of touch electrode segments across the neck region is greater than or equal to the second width and less than the length of the first width.

13. The touch screen of claim 1, wherein:

the first layer comprises a first metal mesh layer;

the plurality of touch electrodes is formed from metal mesh disposed in the first metal mesh layer; and electrical discontinuities in the first metal mesh layer form a boundary between a portion of the contiguous column touch electrode and one or more touch electrode segments of the plurality of touch electrode segments, and wherein the boundary is a zig-zag pattern.

14. The touch screen of claim 1, wherein:

the first layer comprises a first metal mesh layer;

the plurality of touch electrodes is formed of metal mesh disposed in the first metal mesh layer;

the metal mesh of a portion of the contiguous column touch electrode is at a same electrical potential relative to a reference potential; and the metal mesh of the portion of the contiguous column touch electrode includes electrical discontinuities internal to an area of the portion of the contiguous column touch electrode.

15. The touch screen of claim 1, wherein:

the first layer comprises a first metal mesh layer;

the plurality of touch electrodes is formed of metal mesh disposed in the first metal mesh layer;

the metal mesh of a touch electrode segment of the plurality of touch electrode segments is at a same electrical potential relative to a reference potential; and the metal mesh of the touch electrode segment of the plurality of touch electrode segments includes electrical discontinuities internal to an area of the touch electrode segment of the plurality of touch electrode segments.

16. The touch screen of claim 1, wherein a pattern of electrical discontinuities internal to an area of a touch electrode of the plurality of touch electrodes repeats across the area of the touch electrode of the plurality of touch electrodes.

17. The touch screen of claim 1, wherein:

the first layer comprises a first metal mesh layer;

the plurality of touch electrodes is formed of metal mesh disposed in the first metal mesh layer;

the metal mesh of a portion of the contiguous column touch electrode is at a same electrical potential relative to a reference potential;

a first region of the metal mesh of the portion of the contiguous column touch electrode includes electrical discontinuities internal to an area of the portion of the contiguous column touch electrode;

a second region of the metal mesh of the portion of the contiguous column touch electrode does not include electrical discontinuities internal to the area of the portion of the contiguous column touch electrode; and the second region corresponds to a neck region between two of the plurality of touch electrode segments.

18. A touch-sensitive device comprising:

an energy storage device;

communication circuitry;

a touch controller; and a touch screen comprising:

a display having an active area; and a plurality of touch electrodes formed over the active area of the display, comprising:

a contiguous column touch electrode in a first layer; and a row touch electrode including a plurality of touch electrode segments in the same first layer as the contiguous column touch electrode;

wherein:

each of the plurality of touch electrode segments is separated from the other touch electrode segments in the first layer by the contiguous column touch electrode;

the plurality of touch electrode segments includes pairs of touch electrode segments that have respective first and second edges that face each other; and one or more portions of the contiguous column touch electrode separates the respective first and second edges of the pairs of touch electrode segments, including a first portion that separates the respective first and second edges of a first pair of touch electrode segments and a second portion that separates the respective first and second edges of a second pair of touch electrode segments, different from the first pair of touch electrode segments.

19. The touch-sensitive device of claim 18, wherein the first layer comprises a metal mesh and the plurality of touch electrodes is formed from the metal mesh, the touch screen further comprising:

a plurality of bridges formed at least partially in a second layer, different from the first layer, wherein the plurality of bridges includes a bridge that electrically couples a pair of touch electrode segments of the plurality of touch electrode segments of the row touch electrode.

20. A touch sensor panel, comprising:

a plurality of touch electrodes formed over an active area of a display, comprising:

a contiguous column touch electrode in a first layer; and a row touch electrode including a plurality of touch electrode segments in the same first layer as the contiguous column touch electrode;

wherein:

each of the plurality of touch electrode segments is separated from the other touch electrode segments in the first layer by the contiguous column touch electrode;

the plurality of touch electrode segments includes pairs of touch electrode segments that have respective first and second edges that face each other; and one or more portions of the contiguous column touch electrode separates the respective first and second edges of the pairs of touch electrode segments, including a first portion that separates the respective first and second edges of a first pair of touch electrode segments and a second portion that separates the respective first and second edges of a second pair of touch electrode segments, different from the first pair of touch electrode segments.

* * * * *